United States Patent [19]

Chan

[11] 4,441,008

[45] Apr. 3, 1984

[54] METHOD OF DRILLING ULTRAFINE CHANNELS THROUGH GLASS

[75] Inventor: Uck I. Chan, West Bloomfield, Mich.

[73] Assignee: Ford Motor Company, Dearborn, Mich.

[21] Appl. No.: 301,796

[22] Filed: Sep. 14, 1981

[51] Int. Cl.³ ............................................. B23K 27/00
[52] U.S. Cl. ........................ 219/121 LL; 219/121 LF
[58] Field of Search ................. 219/121 LL, 121 LK, 219/121 LH, 121 LJ, 121 LF, 121 EH, 121 EJ, 121 EK

[56] References Cited

U.S. PATENT DOCUMENTS 3,601,576  8/1971  Schlafli et al. ................ 219/121 LL
3,742,182  6/1973  Saunders ....................... 219/121 LL

FOREIGN PATENT DOCUMENTS 1261706  1/1972  United Kingdom ......... 219/121 LL

*Primary Examiner*—C. L. Albritton
*Attorney, Agent, or Firm*—Joseph W. Malleck; Olin B. Johnson

[57] ABSTRACT

A method is disclosed for generating ultrafine channels through and between opposed surfaces of a thin glass body by preheating the glass body to 500°–1040° F., and directing a beam of laser energy having a wavelength of at least about 10.6 microns along a fixed axis at the preheated body and against one of the surfaces for a period sufficient to melt and vaporize the portion of the glass in the path of the beam. The beam is defocused relative to said one surface and pulsed.

11 Claims, 14 Drawing Figures

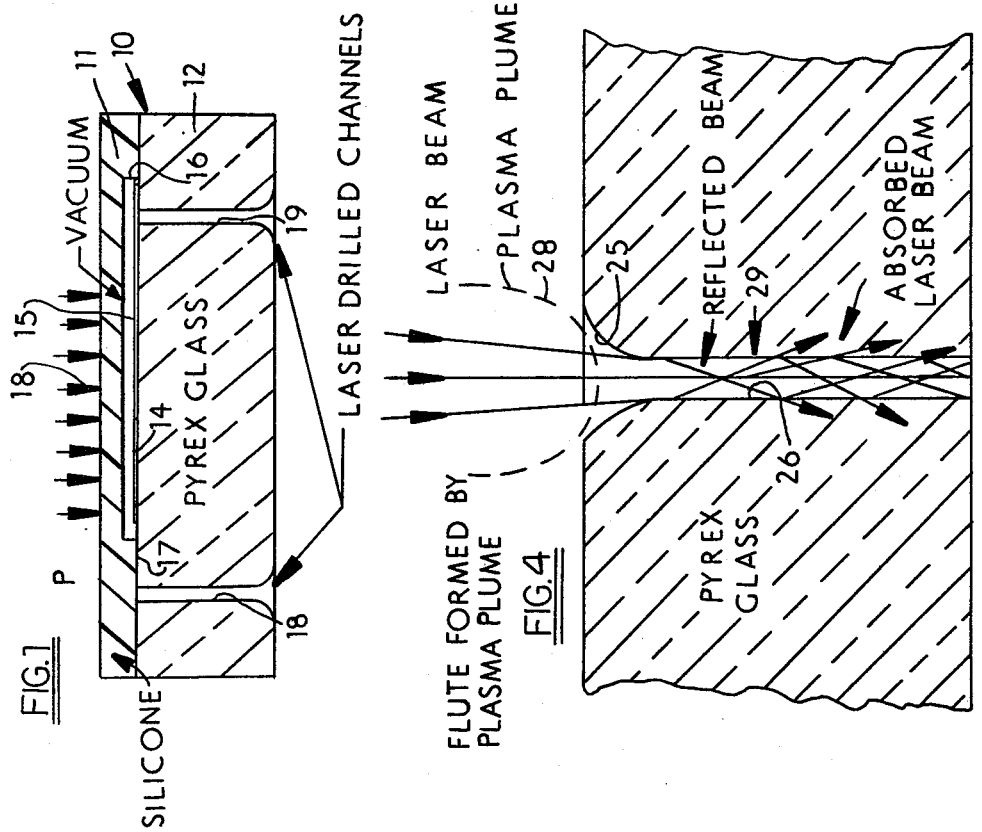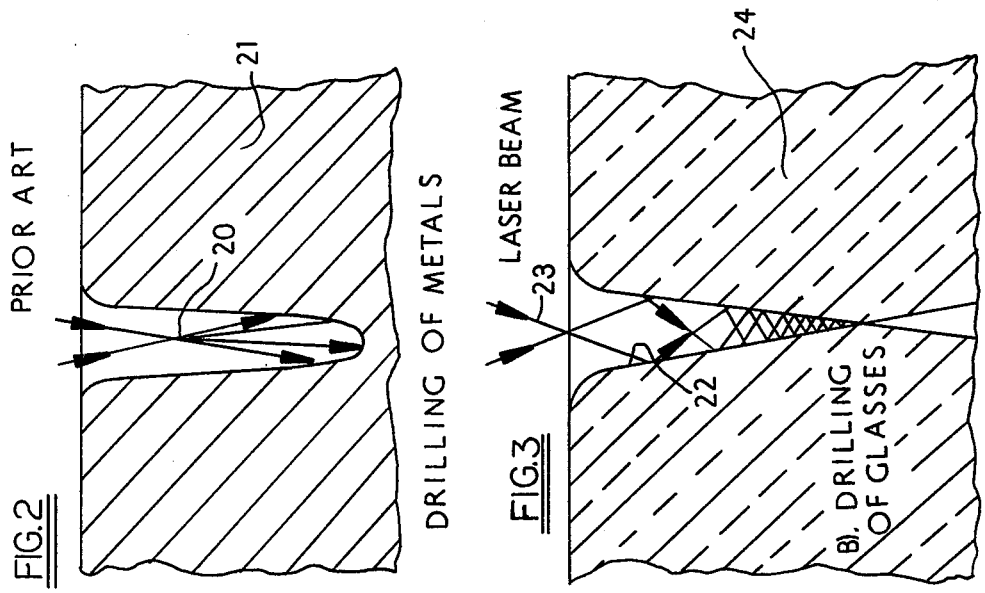

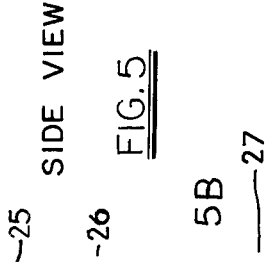
FIG. 5
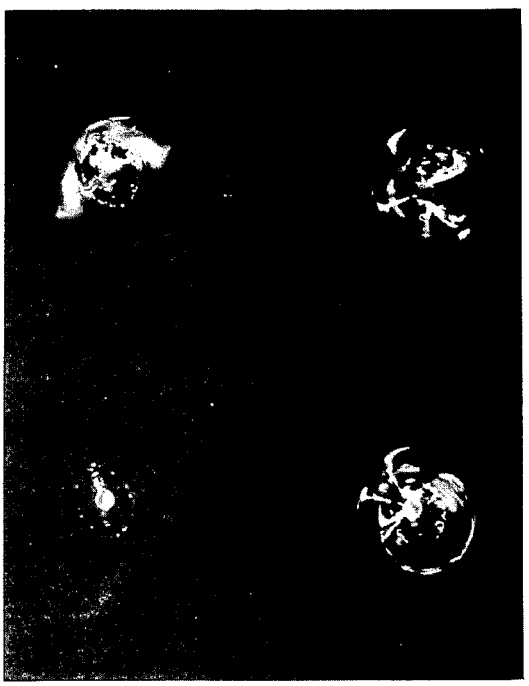
FIG. 6

I       I    I    I    I       I
-0.07  -0.04 -0.02  0   0.02   0.05
              DEFOCUSING ( IN.)

-0.01  -0.02  -0.03  -0.04  -0.05  -0.06  -0.07  -0.08

( Defocusing - in. )

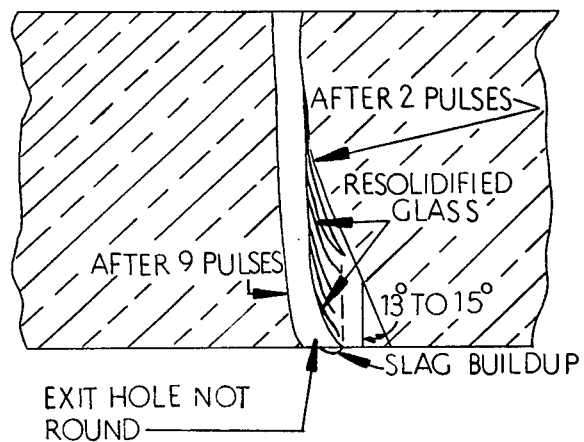
FIG.14
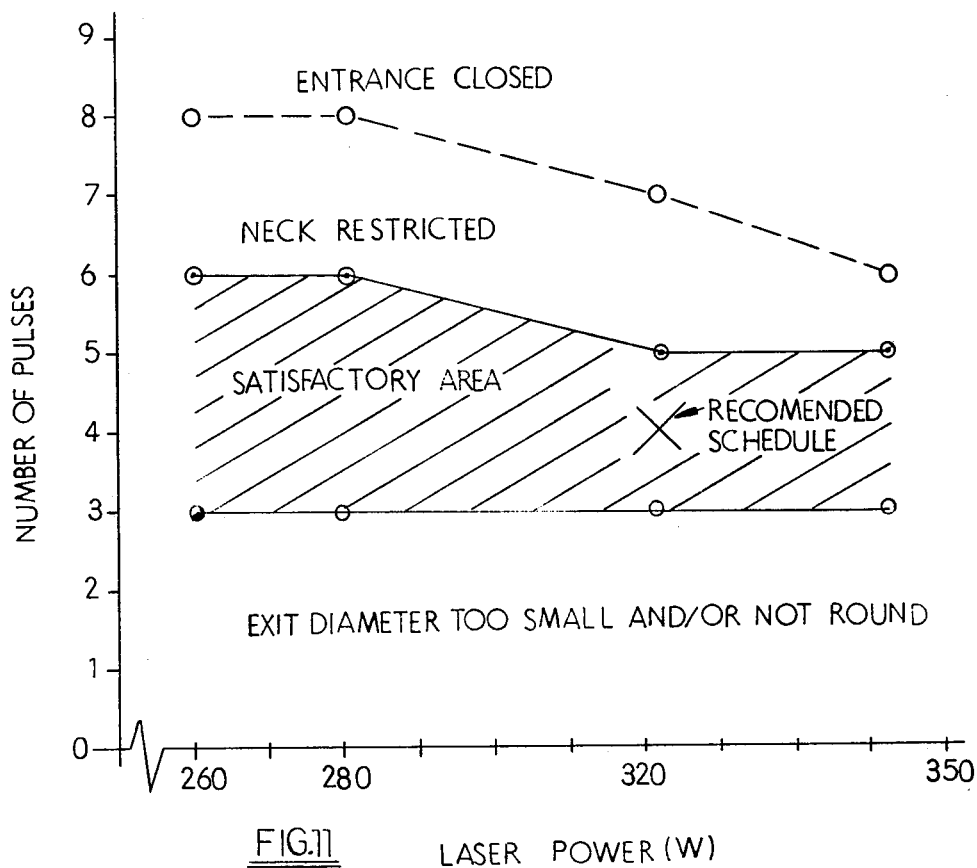
FIG.11    LASER POWER (W)

METHOD OF DRILLING ULTRAFINE CHANNELS THROUGH GLASS

BACKGROUND OF THE INVENTION AND PRIOR ART STATEMENT

It has been known for some time that the output of a laser could be focused to a small area of high intensity to create holes in certain types of substrates. The substrates were ones which absorbed the high energy of the laser beam to produce a resultant localized boiling and evaporation of the substrate within the path of the beam. Materials which have been found to be absorptive to laser energy have typically been metals (see U.S. Pat. No. 3,696,504), jewel minerals (see U.S. Pat. Nos. 3,601,576 and 3,527,198), and plastics (see U.S. Pat. No. 3,971,910, particularly column 2, line 38). All of these materials are opaque in varying degrees to energy beams such as lasers and are not transparent for such use. Accordingly, laser energy is absorbed which makes possible the generation of heat within the material to vaporize the material in the path of the beam, creating an opening or hole.

However, with materials which are seemingly transparent to laser energy and permit the transmission of beam energy therethrough, such as a sheet of clear glass, it has been thought that the glass would be unable to absorb and convert the laser energy to heat to form a required hole. This attitude of the prior art is demonstrated in U.S. Pat. No. 3,410,979, wherein supplementary means, in the form of a metal plate, was required behind the sheet of glass through which a drilled hole is desired. The laser beam was focused upon the interface between the glass and metal plate; heat generated by the beam impinging on the metal plate caused a localized boiling of the metal of the plate and such boiled metal was discharged back through the glass plate toward the laser to form the desired hole (see column 2, lines 10–14).

It has been discovered as part of the present invention that a certain type of laser energy, of a required wave length, is not transparent to clear glass. In addition, it has been discovered that certain processing parameters, if followed, will facilitate the generation of ultrafine channels through glass by use of the required laser energy. The dimension and quality of the channel can be controlled to a high degree of reliability, without flaws in the glass structure, and satisfactory for use as part of an electrical channel in a sensitive capitance sensor.

SUMMARY OF THE INVENTION

The invention is method of generating ultrafine channels through and between opposed surfaces of a glass body by preheating the glass body to the temperature range of 500°–1040° F. (preferably 500°–700° F.), and directing a beam of laser energy along a fixed axis at the preheated body and against one of the surfaces for a period sufficient to melt and vaporize the portion of the glass in the path of the beam. The laser energy used has a wave length of at least about 10.6 microns and an energy level of 200–500 watts in order to be effective in vaporizing the glass material. The beam is focused at a point away from the one surface, preferably at a point which is spaced a distance of 0.02–0.08 inches away from said one surface, and more preferably between the opposed surfaces.

To increase the dimensional and quality control of the ultrafine channel, it has been found advantageous to pulse the beam of laser energy in a manner so that it has on and off periods, with the on periods preferably limited to 6–12 milliseconds, the off periods to 2–50 milliseconds, and the number of pulses preferably limited to 3–5, particularly when attempting to define channels through a glass body having a thickness in the range of 0.03–0.09 inches. It is preferable that the axis of said beam be oriented normal to the surface against which it is directed, but an angle of incidence up to 10 degrees can be tolerated.

With this method it is possible to obtain a high degree of productivity in drilling of multiple channels through very thin glass bodies, such that the total drilling time for each channel is limited to the period of not more than 500 and optimally 70–110 milliseconds. It has been found that the use of a $CO_2$ laser beam is particularly effective in drilling of channels through pyrex glass, the latter typically having a composition which consists essentially of 81% $SiO_2$, 2% $Al_2O_3$, 13% $B_2O_3$ and 4% $Na_2O_3$.

DESCRIPTION OF THE DRAWINGS

FIG. 1 is a central sectional view of a silicon capacitance absolute pressure sensor, the ultrafine channels in the glass portion of said sensor being generated by the method of this invention;

FIG. 2 is a portion of a metal body having an opening generated by the use of a laser beam in accordance with the prior art;

FIG. 3 is a portion of a glass body having an opening drilled by the use of a long wave length laser beam absorptive to glass;

FIG. 4 is a sectional view of a portion of a glass body containing a completed channel generated through and between the opposed surfaces of the glass body by the use of long wave length laser energy;

FIG. 5 is a composite of photographic views (top, side and bottom) of the channel of FIG. 4, the glass body having been preheated and the laser beam irradiated on said glass body in accordance with the method of this invention;

FIG. 6 is a composite photograph showing plan views of different openings beam drilled through glass bodies, portions 6b–6d illustrating different types of cracks that appear on improperly preheated glass bodies;

FIG. 11 is a graphical illustration of the number of pulses in beam drilling as a function of the laser power;

FIG. 14 is a cross-sectional sketch of a laser drilled channel showing an advanced stage of non-symmetry as well as slag buildup; and

DETAILED DESCRIPTION

Figure 7:
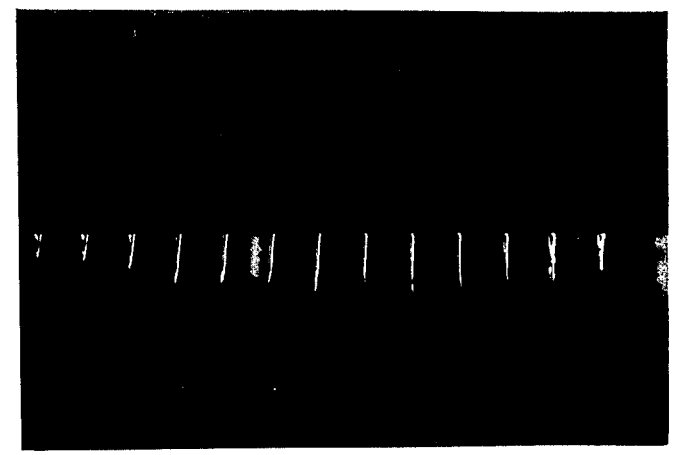
FIG. 7 is a photographic illustration of various channels that have been irradiated by a $CO_2$ laser of single short pulse, showing the different channel configurations resulting from a variation in the defocusing location penetration.

The method of this invention has particular utility in the fabrication of silicon capacitance absolute pressure sensors (SCAP). Such sensor 10 (see FIG. 1) is a device that is used to determine engine air/fuel requirements for control of emissions and reduction of fuel consumption. To sense absolute pressure, a wafer of silicon 11 bonded to a glass disc 12 is gaseous pressure 13 to be measured. An electrical current is passed along a metallic film 14 disposed on the wall of a cavity 15 defined by a groove between the interface of the silicon wafer 11 and the disc of pyrex glass 12. Vacuum is maintained in the chamber; the capacitance of the device will vary as a function of the absolute pressure acting on the silicon wafer. The detailed function of the sensor is set forth in U.S. Pat. No. 4,261,086, the disclosure of which is incorporated herein.

At least two channels 18-19 in the glass disc are required to define openings for carrying electrical leads to film 14, again as a film coating on the channel side wall. The shape, size and quality of the channel determines the quality of coating for the electrical leads and thereby the accuracy of the sensor. Ultrafine openings are necessary with channel diameters in the range of 0.005-0.015 inches, the glass disc being typically 0.030-0.062 inches thick.

Laser drilling of metals is a known art. Metals are considered absorptive of most forms of energy. In drilling openings utilizing lasers, the beam is normally defocused below the surface of the metal 21, such as at 20 shown in FIG. 2, to obtain penetration. The energy is not readily reflected by the side walls of the opening created and the hole will progress in a shape as shown. Typical parameters utilized in drilling openings in metals by use of a laser beam comprise an energy level of 375-400 watts, an energy wave length that can be either short or long, but typically about one micron, and a single energy pulse usually of about 0.1 second.

It has been discovered that the use of a long wave length laser energy beam facilitates and makes possible the drilling of normally transparent materials like glass. The long wave length is absorbed to a desirable degree by the glass and is not generally transmitted as would short wave length energy. A wave length of at least about 10.6 microns is deemed necessary to be a long wave length for purposes of this invention. Contrary to the phenomenon in metals, such long wave length laser beam 23 will be refocused by the side walls 22 of the drilled holes and will assist in the dimensional control and penetration of the glass body 24 (see FIG. 3).

As shown in FIG. 4, imposing such beam upon a thin disc of glass for a minimum period of time, the entrance side 25 of the channel will have a large flare, the midsection 26 will be tubular, and the exit side 27 will have rounded corners. The entrance side flare is considered to be caused by "plasma plume" 28. The impinging laser beam explosively heats the emerging disintegrated material, creating a bright column of superheated particles and vapors which is called a plasma plume. The hot plasma plume melts the edges of the entrance hole thus creating a large flare. The impinging beam, partially diffused by the plasma plume, continues to drill and enlarge the hole until the absorbed energy equals the conduction heat loss through the hole wall. As the hole enlarges, the incidence angle 29 increases and more of the beam energy will be reflected down to the bottom end of the hole. This beam reflection by the side walls of the hole is responsible for the shape of the channel. The exit side edges are rounded because of reduced heat capacity of the edges and the surface tension of a thin molten glass layer covering the inner surface of the hole. A photograph of a typical $CO_2$ laser (long wave length) drilled channel in a 0.062 inch thick pyrex glass disc is shown in FIGS. 5a–5c.

Preferred Method

The preferred method for carrying out the invention herein for generating a desirably configured ultrafine channel through and between opposed surfaces of a glass body comprises:

1. preheating the glass body to the temperature range of 500°–1040° F. (260°–560° C.); and
2. directing a beam of laser energy along a fixed axis at the preheated body and against one of said surfaces for a period sufficient to melt and vaporize the portion of said glass body in the path of said beam. The laser energy has a wave length of at least about 10.6 microns and an energy level of 200–500 watts, the beam is focused at a point between the opposed surfaces and preferably the focus point is spaced a distance of 0.02–0.08 inches below the one surface.

Advantageously, the laser beam is pulsed on and off with on periods of 6–12 milliseconds, with the number of pulses being preferably in the range of 3–5, and the off periods of each of the pulses being in the range of 2–50 milliseconds. It is preferred that the total time for generating a single channel, even though drilling a multiple number of openings in the same glass disc, be limited to less than 500 milliseconds and optimally 70–110 milliseconds.

It is preferred that the composition of the glass consist essentially of 81% $SiO_2$, 2% $Al_2O_3$, 13% $B_2O_3$, 4% $Na_2O_3$, with commercially accepted impurities. This composition corresponds to the commerically known pyrex glass having a manufacturing designation of Corning 7740. The glass wafer through which the laser beam is passed should preferably be in the range of 0.03–0.09 inches.

To promote increased symmetry of the channel configuration, the thickness of glass should be reduced to preferably 0.03", the desired hole diameter should be increased to about 0.015" diameter, the angle of incidence of the laser beam with the one surface should be optimally zero degrees and may range up to 10–15 degrees. To promote symmetry, it is desirable that the pyrex glass be fabricated with a high degree of homogeneity. It is preferred that a blowing gas be employed to remove vaporized material from the beam passage and that a lens with a focal length in excess of 1.5 inches be employed to focus the laser beam. Utilizing these parameters, non-symmetrical channels can be eliminated.

Preheating

Initial attempts to laser drill a glass were conducted without preheating. The procedure always resulted in cracked channels. The observed crack patterns are shown in FIG. 6. In specimens preheated to 300° F., the cracks were of the moon type (portion 6b), while those in the no-preheat specimens included both star type (6d) and star-moon type cracks (6c). These cracks may be compared with the photograph portion 6a of a glass preheated to 500° F., which contained no cracking.

Cracks develop due to high thermal shock and residual stresses which result from laser beam drilling. Many cracks appear some time after the laser drilling, indicating that the major cause of crack development is the residual shrinkage stress at or around the hole, rather than the thermal shock or mechanical shock stress. Preheating of the specimen to 500° F. reduces the residual tangential stress by 30%. Preheating to 300° F. reduces the stress by only 15%, which is insufficient. If the specimen is preheated to the annealing temperature (1040° F.), the stress will be reduced by approximately 70% and no holes will be observed with cracks due to the automatic annealing after drilling.

Penetration

The degree to which a single, short pulse of laser energy will penetrate a 0.062" glass disc was investigated. As shown in FIG. 7, various channels were drilled utilizing a short pulse of less than 2 milliseconds, the beam being created by a $CO_2$ laser (10.6 microns wave length), having a power level of 320 watts. The deepest penetration for the drilling of glass by $CO_2$ laser beam was obtained when the beam was focused on the specimen surface, contrary to drilling metals. The entrance hole diameter is the smallest when the focus setting is at the surface; such hole diameter is too small for meeting the requirements of the SCAP sensor. The desired entrance hole diameter was obtained when defocusing was set at a certain value, preferably a negative 0.05 inches. Although positive as well as negative defocusing will work for obtaining a desirable hole diameter, positive defocusing tends to produce elliptical hole sections. Negative defocusing offers truer round channel sections and provides more lattitude in the range of useful defocusing. It may also be desirable to increase the degree of negative defocusing in proportion to an increase in pulse period.

Pulse Length

Figure 8:
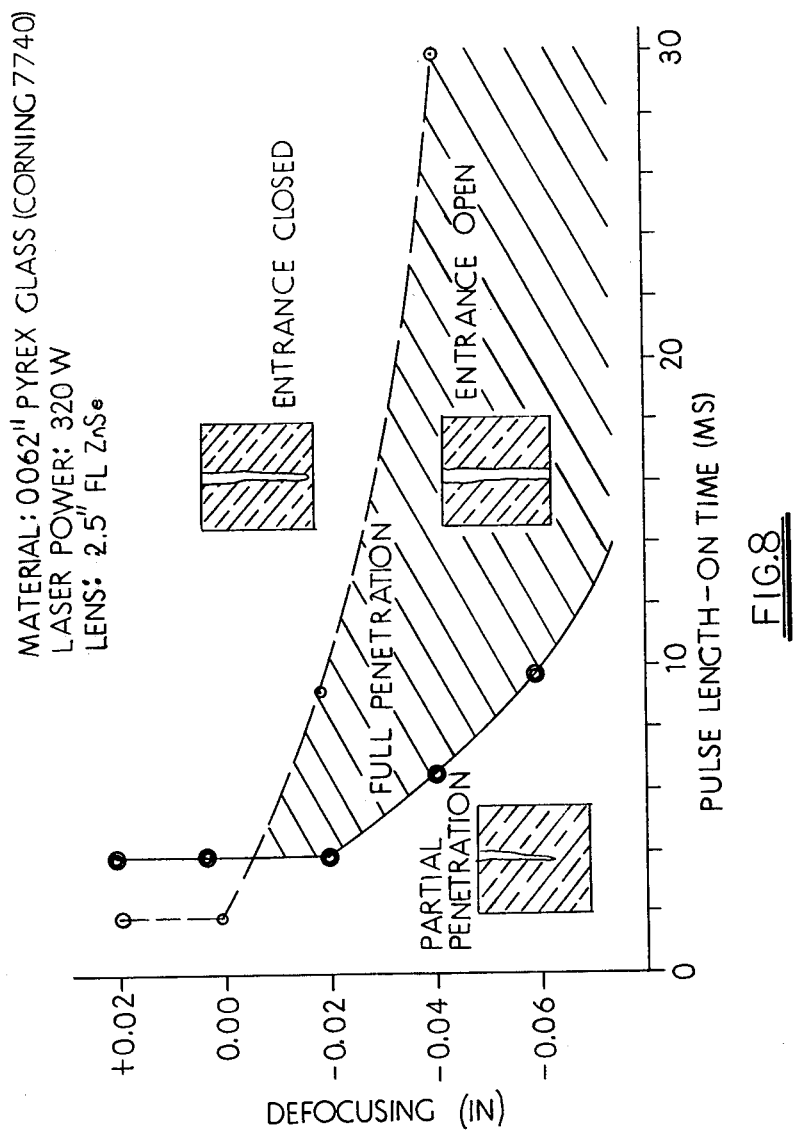
FIG. 8 is a graphical illustration with inset sketches depicting the types of channels that were generated by varying the point of focusing as a function of the pulse length during on time.

As shown on FIG. 8, a series of openings were generated to investigate the variation of the channel configuration with pulse length and defocusing. The hatched area of the figure represents a region where complete through channels were generated, and the regions above (entrance closed) and below the shaded region (partial penetration) produced incomplete channels. The entrance side of the hole was closed when insufficient defocusing was used with a relatively long pulse period. The resultant molten glass filled the entrance of the initial hole. Adequate defocusing prevented the entrance from closing. For example, the amount of defocusing should be larger than 0.02 inches when a 10 millisecond pulse period is used. It was found that a pulse period of 6–30 milliseconds was useful when a defocusing range of minus 0.02–0.07 was employed, which as a combination gave completed channels.

Number of Pulses

Figure 9:
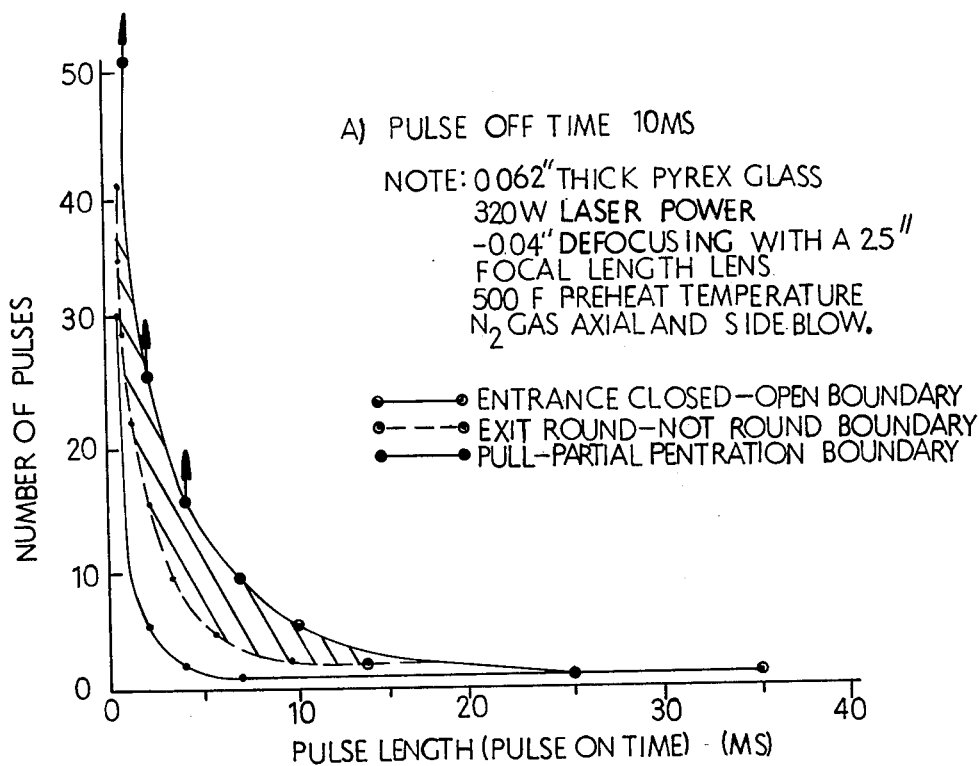
FIGS. 9 and 10 are graphical illustrations of the variation of the number of pulses with pulse on period; the off period differs between the figures.
Figure 10:
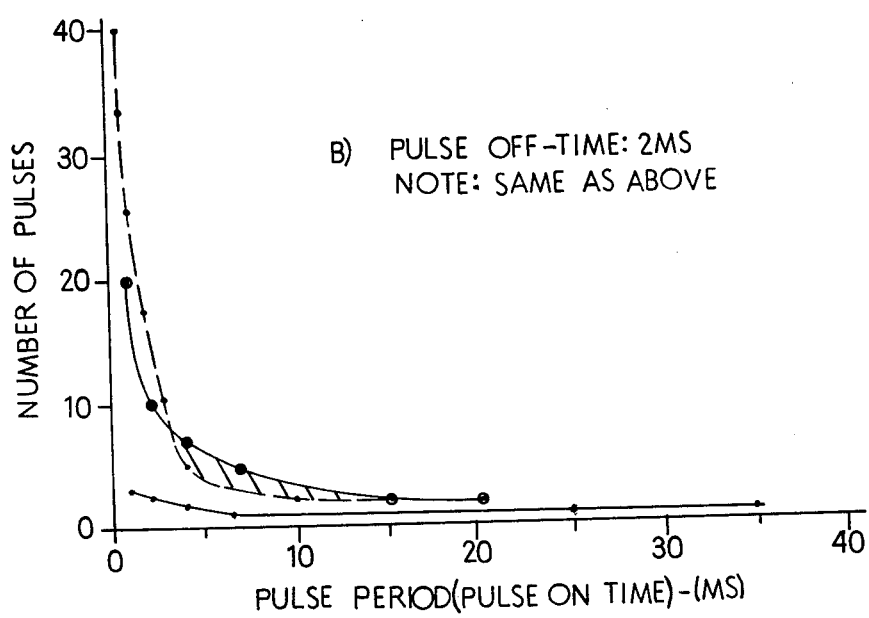
Figure 12:
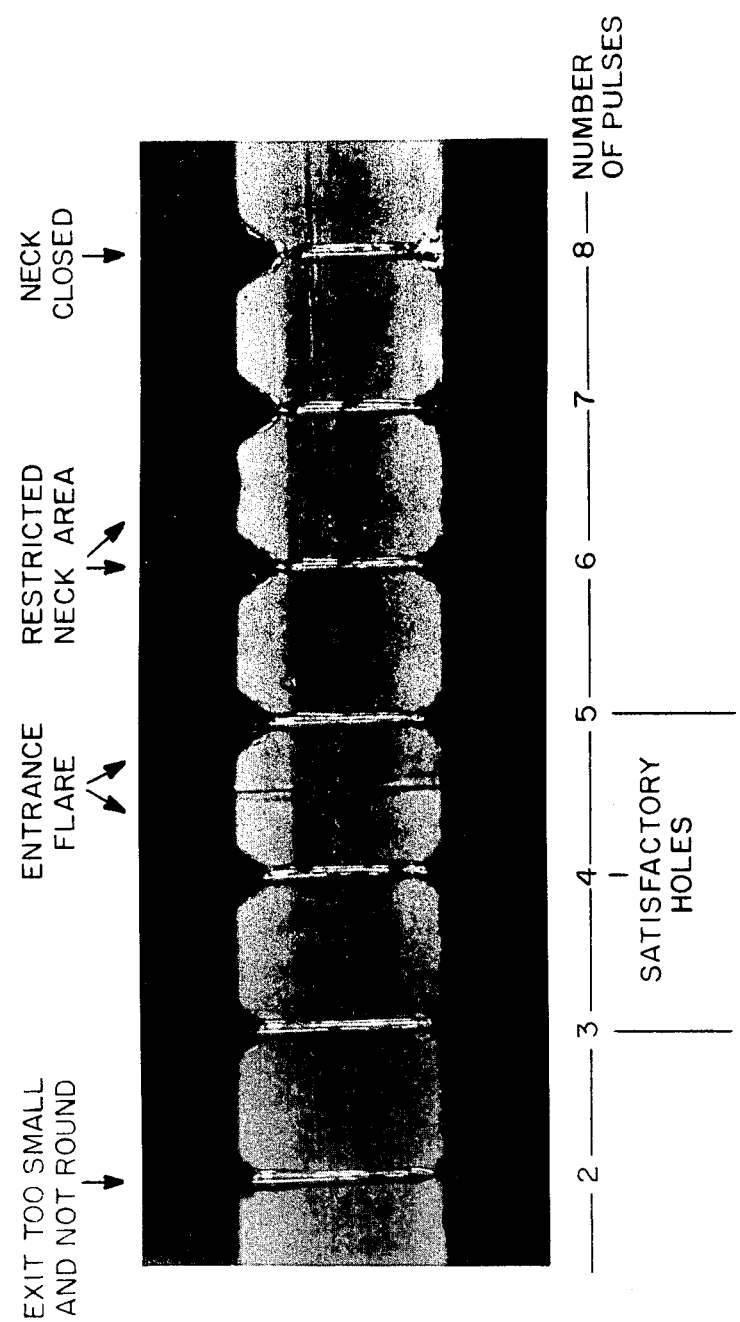
FIG. 12 is a composite photograph of $CO_2$ drilled glass channels which vary as a function of the number of laser pulses.

True holes or completed channels of the hatched area in FIG. 8 were not always of satisfactory quality. Either the entrance or the exit side were irregularly shaped (not round), or the exit diameter was too small (less than 0.005 inches). To obtain satisfactory roundness and uniformity of channels, it was discovered that miltipulse drilling was necessary. As shown in FIGS. 9 and 10, the number of pulses was varied as function of pulse period. The off periods between pulses differed between FIGS. 9 and 10. The hatched areas represent satisfactory regions of hole drilling. From this and other experiments, it was concluded that the proper pulse off time should be longer than 2 milliseconds when the pulse on period of the beam was 10 milliseconds and the beam power at 260-375 watts. The satisfactory manufacturing window for $CO_2$ laser drilling of glass is shown as the hatched area in FIG. 11. Fewer than three pulses produced unsatisfactory exit holes (see FIG. 12), greater than five pulses made the entrance flare larger and the neck smaller to the point where the flare wall eventually closed the neck, as shown in the last hole of FIG. 12. FIG. 12 shows that full penetration of a specimen is not sufficient to produce satisfactory holes. Additional energy is needed to "clean up" the hole and make it acceptable. This additional energy often times is supplied in the form of additional pulses. However, too many pulses close the entrance, as shown.

Figure 13:
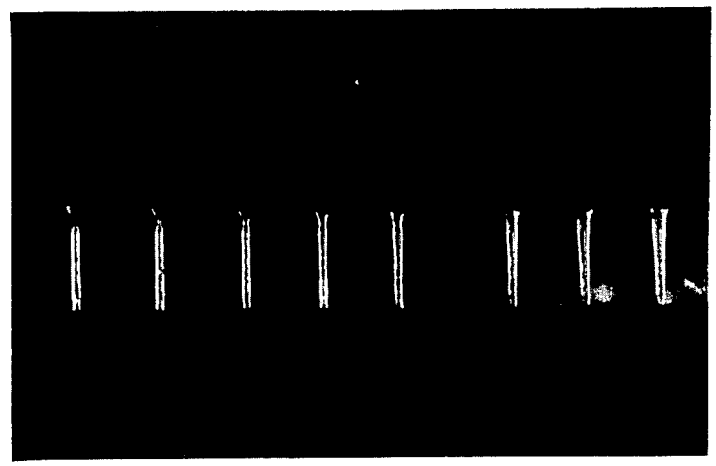
FIG. 13 is a photographic view of several channels that have been beam drilled with defocusing varied below the surface of the glass.

The desired defocusing was found to be in the range of minus 0.03" to minus 0.07". This is shown in FIG. 13, where four pulses were employed utilizing a pulse on period of 10 milliseconds and an off period of 10 milliseconds at a power setting of 320 watts, the glass being preheated to 500° F. The sensitivity of a multiple pulse beam drilling to defocusing shows that at minus 0.02", the entrance opening necks down severely, and at minus 0.08", the entrance becomes too large.

Hole Symmetry

Non-symmetry about the axis of the channel can also occur; it can take the form of a dragon tooth configuration, that is, holes which show crooked ends (see FIG. 14). The dragon tooth shape is caused by reflection of the laser beam by the walls of the holes in a non-symmetrical manner. The crooked end of the hole can be typically angled as much as 13-15 degrees from the axis of the beam. To eliminate such non-symmetrical channels as a result of imbalance in the drilling technique, it is preferred that (a) the glass have a highly homogeneous nature, and (b) the disc of glass be thinner, preferably 0.03" thick, and the diameter be increased to preferably 0.015". It is also theorized that it would be helpful if the focal length of the focusing lens was increased to at least 2.5 inches.

Optimum Drilling Schedules

An optimum drilling schedule was a 375 watt $CO_2$ laser beam, 2.5" focal length ZnSe lens, nitrogen gas flow into exit, on pyrex glass (0.062" thick), is as folows:

| Parameters | Tolerances* |
| --- | --- |
| Average Power: 320 W | (−60 W, +55 W) |
| Preheating Temperature: 500° F. min. | (−0° F., +540° F.) |
| Defocusing: −0.050" | (±0.020") |
| Pulse On-time: 10 ms | (−4ms, +2ms) |
| Pulse Off-time: 10 ms | (−8ms, +40ms) |
| No. of Pulses: 4 | (±1) |

*Tolerances for individual parameter variation.

What is claimed is:

1. A method for generating an ultrafine channel through and between opposed surfaces of a glass body, comprising:
   (a) preheating said glass body to the temperature range of 500°–1040° F. (260°–560° C.); and
   (b) directing a beam of laser energy along a fixed axis at said preheated body and against one of said surfaces for a period sufficient to melt and vaporize the portion of said glass body in the path of said beam, said laser energy having a wave length of at least about 10.6 microns and an energy level of 200-500 watts, said beam being focused at a point away from said one surface at a distance spaced from said one surface in the range of 0.02-0.08 inches.

2. A method of generating an ultrafine channel through and between opposed surfaces of a glass body, comprising:
(a) preheating said glass body to the temperature range of 500°-1040° F. (260°-560° C.); and
(b) directing a beam of laser energy along a fixed axis at said preheated body and against one of said surfaces for a period sufficient to melt and vaporize the portion of said glass body in the path of said beam, said laser energy having a wave length of at least about 10.6 microns and an energy level of 200-500 watts, said being being focused at a point away from said one surface and is pulsed on and off with the on periods being in the range of 6-12 milliseconds.

3. The method as in claim 2, in which the number of pulses is limited to 3-5.

4. The method as in claim 2, in which the off periods are in the range of 2-50 milliseconds.

5. A method of generating an ultrafine channel through and between opposed surfaces of a glass body, comprising:
(a) preheating said glass body to the temperature range of 500°-1040° F. (260°-560° C.); and
(b) directing a beam of laser energy along a fixed axis at said preheated body and against one of said surfaces of a period sufficient to melt and vaporize the portion of said glass body in the path of said beam, said glass body having the spacing between said opposed surfaces in the range of 0.03-0.09 inches, said laser energy having a wave length of at least about 10.6 microns and an energy level of 200-500 watts, said beam being focused at a point away from said one surface.

6. The method as in claim 5, in which the total time for generating said channel is limited to less than 500 milliseconds.

7. The method as in claim 1, in which the axis of said beam defines an angle of incidence with respect to the plane of said one surface from zero to 10 degrees.

8. A method of beam drilling ultrafine cylindrical channels through and between opposed surfaces of a glass body consisting essentially of about 81% $SiO_2$, about 2% $Al_2O_3$, about 13% $B_2O_3$ and about 4% $Na_2O_3$, said opposed surfaces being separated by a distance of 0.03-0.09 inches, the method comprising:
(a) preheating said glass body to the temperature range of 500°-700° F.;
(b) irradiating one of said surfaces of said preheated glass body by directing a beam of laser energy thereagainst, said beam being pulsed 3-5 times with the on periods of said pulsing being in the range of 6-12 milliseconds and the off periods between said pulses being in the range of 2-50 milliseconds, said beam being focused at a point between said surfaces, said laser energy having a wave length of about 10.6 microns and an energy level of 260-375 watts.

9. The method as in claim 8, in which said beam focused between said surfaces has said focus point located a distance spaced from said one surface within the distance range of 0.02-0.08 inches.

10. The method as in claim 8, in which the total time for generating each channel is limited to 70-110 milliseconds.

11. The method as in claim 8, in which a plurality of spaced, parallel arranged channels are sequentially drilled in said glass body with a total drilling time for each of said channels being limited to less than 500 milliseconds.

* * * * *